US010654981B2

(12) United States Patent
Nakamoto et al.

(10) Patent No.: US 10,654,981 B2
(45) Date of Patent: May 19, 2020

(54) REINFORCED THERMOPLASTIC RESIN COMPOSITION AND MOLDED ARTICLE THEREOF

(71) Applicant: UMG ABS, LTD., Tokyo (JP)

(72) Inventors: Masahito Nakamoto, Ube (JP); Hideichiro Kawaguchi, Ube (JP)

(73) Assignee: UMG ABS, LTD., Tokyo (JP)

( * ) Notice: Subject to any disclaimer, the term of this patent is extended or adjusted under 35 U.S.C. 154(b) by 0 days.

(21) Appl. No.: 15/780,523

(22) PCT Filed: Jan. 17, 2017

(86) PCT No.: PCT/JP2017/001352
§ 371 (c)(1),
(2) Date: May 31, 2018

(87) PCT Pub. No.: WO2017/130788
PCT Pub. Date: Aug. 3, 2017

(65) Prior Publication Data
US 2018/0371186 A1 Dec. 27, 2018

(30) Foreign Application Priority Data
Jan. 26, 2016 (JP) .................. 2016-012450

(51) Int. Cl.
*C08J 5/00* (2006.01)
*C08L 69/00* (2006.01)
*C08L 67/02* (2006.01)
*C08L 51/04* (2006.01)
*C08K 5/521* (2006.01)
*C08K 3/00* (2018.01)
*C08J 5/04* (2006.01)
*C08F 285/00* (2006.01)

(52) U.S. Cl.
CPC ............. *C08J 5/005* (2013.01); *C08F 285/00* (2013.01); *C08J 5/042* (2013.01); *C08J 5/043* (2013.01); *C08K 3/00* (2013.01); *C08K 5/521* (2013.01); *C08L 51/04* (2013.01); *C08L 67/02* (2013.01); *C08L 69/00* (2013.01); *C08J 2369/00* (2013.01); *C08J 2427/18* (2013.01); *C08J 2451/04* (2013.01); *C08J 2463/00* (2013.01); *C08J 2463/02* (2013.01); *C08J 2467/02* (2013.01); *C08L 2201/02* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 5,189,091 A | 2/1993 | Laughner | |
| 2009/0062412 A1 | 3/2009 | Eipper et al. | |
| 2010/0273922 A1* | 10/2010 | Fujimoto | C08L 51/04 524/145 |
| 2013/0237644 A1 | 9/2013 | Xin et al. | |
| 2016/0060456 A1 | 3/2016 | Imada et al. | |
| 2016/0185957 A1 | 6/2016 | Imada | |
| 2016/0208092 A1 | 7/2016 | Imada | |
| 2016/0319126 A1* | 11/2016 | Nakamoto | C08L 63/00 |

FOREIGN PATENT DOCUMENTS

| | | |
|---|---|---|
| CN | 102604352 A | 7/2012 |
| CN | 104559115 A | 4/2015 |
| EP | 0803537 A2 | 10/1997 |
| JP | 60-088062 A | 5/1985 |
| JP | 06-298991 A | 10/1994 |
| JP | 2001-240738 A | 9/2001 |
| JP | 2004-035812 A | 2/2004 |
| JP | 2004-182939 A | 7/2004 |
| JP | 2005-238529 A | 9/2005 |
| JP | 2006-022436 A | 1/2006 |
| JP | 2006-299061 A | 11/2006 |
| JP | 2008-519874 A | 6/2008 |
| JP | 2008-231301 A | 10/2008 |
| JP | 2009-155576 A | 7/2009 |
| JP | 2010-024312 A | 2/2010 |
| JP | 2010-077196 A | 4/2010 |
| JP | 2010-202748 A | 9/2010 |
| JP | 2010-275556 A | 12/2010 |
| JP | 2012-077241 A | 4/2012 |
| JP | 2013-014747 A | 1/2013 |
| JP | 2013-147651 A | 8/2013 |
| JP | 5796121 B1 | 10/2015 |
| JP | 2015-214615 A | 12/2015 |

(Continued)

OTHER PUBLICATIONS

International Search Report and Written Opinion dated Apr. 11, 2017 for PCT Application No. PCT/JP2017/001352, with English translation.

(Continued)

*Primary Examiner* — Ana L. Woodward
(74) *Attorney, Agent, or Firm* — Plumsea Law Group, LLC

(57) ABSTRACT

A reinforced thermoplastic resin composition which has good moldability and can increase a rigidity, impact resistance, mechanical strength, heat resistance and flame retardancy of an obtained molded article, and a molded article having a high rigidity, impact resistance, mechanical strength, heat resistance, flame retardancy, and weld strength. The reinforced thermoplastic resin composition including 80% to 100% by mass of a polycarbonate resin (A); a resin main component (C) containing 0% to 20% by mass of a specific graft copolymer (G); a polyethylene terephthalate resin (B) obtained by solid phase polymerization of recycled and/or repelletized material; an inorganic filler (D); and a glycidyl ether unit-containing polymer (E) having a mass average molecular weight of 3,800 to 60,000 at a specific ratio.

20 Claims, No Drawings

(56) References Cited

FOREIGN PATENT DOCUMENTS

| JP | 2016-001562 A | 1/2016 |
| JP | 2016-050297 A | 4/2016 |
| JP | 2016-088443 A | 5/2016 |
| JP | 2016-108355 A | 6/2016 |
| JP | 2016-124986 A | 7/2016 |
| JP | 2016-132718 A | 7/2016 |

OTHER PUBLICATIONS

Office Action dated Mar. 22, 2016 for Japanese Patent Application No. 2016-012450, with English machione translation.
Office Action dated Aug. 3, 2017 for Taiwan Patent Application No. 106102138, with English translation.
Office Action dated Nov. 28, 2018 in Chinese Patent Application No. 201780004222.2., and English translation thereof.
P. Genhet H. Mille, "Plastics Additives", Beijing Industry Publishing House,1st edition, pp. 425, 468 and 480, Jan. 2000.

\* cited by examiner

REINFORCED THERMOPLASTIC RESIN COMPOSITION AND MOLDED ARTICLE THEREOF

BACKGROUND OF THE INVENTION

Technical Field

The present invention relates to a reinforced thermoplastic resin composition and a molded article using the same. Priority is claimed on Japanese Patent Application No. 2016-012450, filed on Jan. 26, 2016, the content of which is incorporated herein by reference.

Background Art

As a material of a housing of mobile devices (a notebook type or tablet type personal computer, mobile phones including a smart phone, a digital camera, a digital video camera, and the like), a thermoplastic resin composition (ABS resin, polycarbonate resin/ABS resin, polyamide resin, polycarbonate resin/polyester resin and the like), or a material obtained by reinforcing the thermoplastic resin composition with an inorganic filler has been widely used. As a method of manufacturing the housing, a method of molding the thermoplastic resin composition by injection molding, which is capable of freely molding a shape to some extent, is usually adopted.

In recent years, for the housing of the mobile device, it is required to further reduce a thickness, to be sufficiently resistant to impact and load in a state of being placed in a bag or the like, to be unpainted for the purpose of cost reduction, and the like.

In order to satisfy these requirements, the thermoplastic resin composition used for the housing is required to have high rigidity when formed into the molded article, impact resistance, mechanical strength, flame retardancy, high weld strength, good moldability at the time of molding, and the like.

However, since the rigidity of the thermoplastic resin compositions such as an ABS resin, a polycarbonate resin/ABS resin, a polyamide resin, and a polycarbonate resin/polyester resin which are not reinforced by the inorganic filler is low when formed into the molded article, the thermoplastic resin compositions cannot cope with the requirement of reducing the thickness of the housing. In addition, since the polyamide resin has high hygroscopicity, warpage, dimensional change, and appearance deterioration are likely to occur in the molded article over time after molding.

The reinforced thermoplastic resin composition obtained by adding the inorganic filler such as glass fiber or carbon fiber to the thermoplastic resin composition described above has improved the rigidity when molded.

However, the reinforced thermoplastic resin composition containing the ABS resin, the polycarbonate resin/ABS resin, or the polycarbonate resin/polyester resin as a main component has high rigidity when formed into a molded article, and although the housing can be reduced in thickness, weld strength and impact resistance, when formed into the molded article, are insufficient.

In particular, the reinforced thermoplastic resin composition containing the polycarbonate resin/polyester resin as a main component also has poor thermal stability.

In addition, by being kept at a high temperature in a cylinder in a molding step, decomposition gas is generated by a transesterification reaction between the polycarbonate resin and the polyester resin, and an appearance defect of the molded article called bubbles and silver streaks is likely to occur. In addition, due to a decrease in a molecular weight of the polycarbonate resin, the original impact resistance, heat resistance and the like of the polycarbonate resin may be impaired. Furthermore, there are problems that a viscosity of the polycarbonate resin changes due to retention at a high temperature, molding stability at the time of injection molding is impaired, and a short shot (unfilled at flow end portion) or burr of the obtained molded article occurs.

On the other hand, the reinforced thermoplastic resin composition containing the polyamide resin as the main component is excellent in weld strength and mechanical strength when formed into the molded article, but cannot solve the above-described problems of warpage, dimensional change, and appearance deterioration. This is a problem caused by moisture absorption of the molded article after molding, and is not a problem that can be solved by drying a molding material before molding.

As a reinforced thermoplastic resin composition capable of obtaining a molded article excellent in impact resistance, the following have been proposed.

(1) A reinforced thermoplastic resin composition containing a specific amount of an polycarbonate resin, a graft copolymer, a glass fiber surface-treated with a water-soluble polyurethane, a glycidyl ether unit-containing polymer, and a phosphate ester-based flame retardant (PTL 1).

(2) A reinforced thermoplastic resin composition containing a specific amount of an aromatic polycarbonate resin, a fibrous filler surface-treated with polyamide, and a lubricant having at least one functional group selected from a carboxyl group, a carboxylic acid anhydride group, an epoxy group, and an oxazoline group (PTL 2).

As a reinforced thermoplastic resin composition capable of obtaining a molded article excellent in mechanical strength and molding stability, the following have been proposed.

(3) A reinforced thermoplastic resin composition containing a specific amount of a polycarbonate resin, a rubber-containing polymer, and a carbon fiber converged with a nylon-based sizing agent (PTL 3).

(4) A reinforced thermoplastic resin composition containing a polycarbonate resin, a rubber-containing polymer, a polyethylene terephthalate subjected to deactivation treatment of polycondensation catalyst, a milled fiber, and an olefin-based polymer having a functional group reactive with polycarbonate (PTL 4).

CITATION LIST

PTL 1: Japanese Unexamined Patent Application, First Publication No. 2013-14747
PTL 2: Japanese Unexamined Patent Application, First Publication No. 2001-240738
PTL 3: Japanese Unexamined Patent Application, First Publication No. S 60-88062
PTL 4: Japanese Unexamined Patent Application, First Publication No. 2012-77241

SUMMARY OF THE INVENTION

Technical Problem

However, the reinforced thermoplastic resin composition of the above (1) has insufficient weld strength when formed into a molded article.

In addition, the reinforced thermoplastic resin composition of the above (2) has a problem that the mechanical strength (such as bending strength) when formed into the molded article was lowered.

Furthermore, the reinforced thermoplastic resin composition of the above (3) is insufficient in impact resistance when formed into the molded article.

In addition, the reinforced thermoplastic resin composition of the above (4) has low rigidity when formed into the molded article.

In addition to the reinforced thermoplastic resin compositions of (1) to (4), many reinforced thermoplastic resin compositions to which an epoxy compound is added have been proposed for the purpose of improving the mechanical strength of the molded article.

However, a reinforced thermoplastic resin composition excellent in moldability and well-balanced weld strength, rigidity, impact resistance, mechanical strength, heat resistance, and flame retardancy of the obtained molded article has not yet been proposed.

The present invention provides a reinforced thermoplastic resin composition having good moldability and capable of increasing the weld strength, rigidity, impact resistance, mechanical strength, heat resistance, and flame retardancy of the obtained molded article, and a molded article thereof.

Technical Solution

The present invention includes the following aspects.

(1) A reinforced thermoplastic resin composition including 80% to 100% by mass of a polycarbonate resin (A); a resin main component (C) including 0% to 20% by mass of a graft copolymer (G) obtained by polymerizing a monomer mixture (m1) containing an aromatic alkenyl compound and a vinyl cyanide compound in a presence of a rubbery polymer (G1) (herein, the total of polycarbonate resin (A) and graft copolymer (G) is 100% by mass); a polyethylene terephthalate resin (B); an inorganic filler (D); and a glycidyl ether unit-containing polymer (E), and satisfying following requirements (a) to (c).

(a) The polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C).

(b) A content of the inorganic filler (D) is 20% to 50% by mass in 100% by mass of the reinforced thermoplastic resin composition.

(c) The glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C).

(2) A reinforced thermoplastic resin composition including 80% to 100% by mass of a polycarbonate resin (A); a resin main component (C) including 0% to 20% by mass of a graft copolymer (G) obtained by polymerizing a monomer mixture (m1) containing an aromatic alkenyl compound and a vinyl cyanide compound in a presence of a rubbery polymer (G1) (herein, the total of polycarbonate resin (A) and graft copolymer (G) is 100% by mass); a polyethylene terephthalate resin (B); an inorganic filler (D); a glycidyl ether unit-containing polymer (E); and a phosphate ester-based flame retardant (F), and satisfying following requirements (a) to (d).

(a) The polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C).

(b) A content of the inorganic filler (D) is 20% to 50% by mass in 100% by mass of the reinforced thermoplastic resin composition.

(c) The glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C).

(d) A content of the phosphate ester-based flame retardant (F) is 1 to 25 parts by mass with respect to 100 parts by mass of the resin main component (C).

(3) The reinforced thermoplastic resin composition according to (1) or (2), in which the resin main component (C) includes 80% to 95% by mass of the polycarbonate resin (A) and 5% to 20% by mass of the graft copolymer (G).

(4) The reinforced thermoplastic resin composition according to any one of (1) or (3), in which the inorganic filler (D) is a carbon fiber.

(5) The reinforced thermoplastic resin composition according to any one of (1) or (3), in which the inorganic filler (D) is a glass fiber.

(6) A molded article that uses the reinforced thermoplastic resin composition according to any one of (1) to (5).

(7) A method of manufacturing a reinforced thermoplastic resin composition including a step of obtaining a graft copolymer (G) by polymerizing a monomer mixture (m1) containing an aromatic alkenyl compound and a vinyl cyanide compound in a presence of a rubbery polymer (G1); a step of preparing a resin main component (C) with 80% to 100% by mass of a polycarbonate resin (A) and 0% to 20% by mass of the obtained (G) (herein, the total of polycarbonate resin (A) and graft copolymer (G) is 100% by mass); and a step of mixing the above (C), a polyethylene terephthalate resin (B), an inorganic filler (D), and a glycidyl ether unit-containing polymer (E), and satisfying following requirements (a) to (c).

(a) The polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C).

(b) A content of the inorganic filler (D) is 20% to 50% by mass in 100% by mass of the reinforced thermoplastic resin composition.

(c) The glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C).

Advantageous Effects

The reinforced thermoplastic resin composition of the present invention has the good moldability and can enhance the weld strength, the rigidity, the impact resistance, the mechanical strength, the heat resistance, and the flame retardancy of the obtained molded article.

The molded article of the present invention has the high weld strength, the rigidity, the impact resistance, the mechanical strength, the heat resistance, and the flame retardancy.

DETAILED DESCRIPTION

Hereinafter, the present invention will be described in detail.

In the following description, "(meth) acrylate" is a general term for acrylate and methacrylate. In addition, "molded article" is formed by molding a reinforced thermoplastic resin composition of the present invention.

<Reinforced Thermoplastic Resin Composition>

The reinforced thermoplastic resin composition of the present invention a resin main component (C), a polyethylene terephthalate resin (B), an inorganic filler (D), and a glycidyl ether unit-containing polymer (E).

The resin main component (C) contains 80% to 100% by mass of a polycarbonate resin (A) and 0% to 20% by mass of a graft copolymer (G) (herein, total of polycarbonate resin (A) and graft copolymer (G) is 100% by mass).

The graft copolymer (G) is obtained by polymerizing a monomer mixture (m1) in the presence of the rubbery polymer (G1).

It is preferable that the reinforced thermoplastic resin composition of the present invention further contains a phosphate ester-based flame retardant (F).

It is further preferable that the reinforced thermoplastic resin composition of the present invention contains a flame retardant aid (H).

The reinforced thermoplastic resin composition of the present invention may contain other flame retardant (I) other than the phosphate ester-based flame retardant (F), as necessary, as long as the effect of the present invention is not impaired.

The reinforced thermoplastic resin composition of the present invention may contain other components other than the resin main component (C), the polyethylene terephthalate resin (B), the inorganic filler (D), the glycidyl ether unit-containing polymer (E), the phosphate ester-based flame retardant (F), the flame retardant aid (H), and other flame retardant (I), as necessary, as long as the effect of the present invention is not impaired.

Hereinafter, each component ((A) to (I), (G1), (m1), and the like) will be described.

<Polycarbonate Resin (A)>

The polycarbonate resin (A) is a resin obtained from a dihydroxy diaryl alkane. The polycarbonate resin (A) may be unbranched resin or may be branched resin. As the polycarbonate resin (A), one type may be used alone, or two or more types may be used in combination.

As the polycarbonate resin (A), a commercially available product may be used, or a polycarbonate resin manufactured by a known manufacturing method may be used.

Examples of a method of manufacturing the polycarbonate resin (A) include a method of reacting a dihydroxy compound such as a dihydroxydiarylalkane or a polyhydroxy compound with phosgene or a diester of carbonic acid, and a melt polymerization method.

Examples of the dihydroxy diaryl alkane include those having an alkyl group at a position ortho to the hydroxy group. Preferred specific examples of the dihydroxy diaryl alkane include 4,4-dihydroxy 2,2-diphenylpropane (that is, bisphenol A), tetramethyl bisphenol A, or bis-(4-hydroxyphenyl)-p-diisopropyl benzene, and the like.

The branched polycarbonate resin (A) is manufactured, for example, by substituting a portion (for example, 0.2 to 2 mol %) of the dihydroxy compound with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-tri-(4-hydroxyphenyl)-heptane, 1,3,5-tri-(4-hydroxyphenyl)-benzene, and the like.

As the polycarbonate resin (A), one recycled from a compact disc, or the like may be used.

The viscosity average molecular weight (Mv) of the polycarbonate resin (A) is preferably from 15,000 to 35,000. When the viscosity average molecular weight of the polycarbonate resin (A) is 15,000 or more, the impact resistance of the molded article is further enhanced. When the viscosity average molecular weight of the polycarbonate resin (A) is 35,000 or less, moldability of the reinforced thermoplastic resin composition is further enhanced. The viscosity average molecular weight of the polycarbonate resin (A) is more preferably 17,000 to 25,000 from the viewpoint of the particularly excellent balance between mechanical strength and impact resistance of the molded article, and fluidity of the reinforced thermoplastic resin composition.

The viscosity average molecular weight of the polycarbonate resin (A) can be determined by, for example, a solution viscosity. In a case where a commercially available polycarbonate resin (A) is used, a catalog value may be used.

<Rubbery Polymer (G1)>

Examples of the rubbery polymer (G1) include butadiene rubber, styrene-butadiene rubber, acrylonitrile-butadiene rubber, isoprene rubber, chloroprene rubber, butyl rubber, ethylene-propylene rubber, acrylic rubber, ethylene-propylene-nonconjugated diene rubber, epichlorohydrin rubber, diene-acrylic composite rubber, silicone (polysiloxane)-acrylic composite rubber, and the like. Among these, from the viewpoint of good plating performance of the molded article, butadiene rubber, styrene-butadiene rubber, acrylonitrile-butadiene rubber, acrylic rubber, diene-acrylic composite rubber, and silicone-acrylic composite rubber are preferable.

The diene rubber component of the diene-acrylic composite rubber contains 50% by mass or more of a butadiene unit. Examples of the diene rubber component include butadiene rubber, styrene-butadiene rubber, acrylonitrile-butadiene rubber, and the like.

The acrylic rubber component of the diene-acrylic composite rubber is obtained by polymerizing an alkyl (meth) acrylate (f) and a polyfunctional monomer (g).

Examples of the alkyl (meth) acrylate (f) include alkyl acrylate (methyl acrylate, ethyl acrylate, n-propyl acrylate, n-butyl acrylate, 2-ethyl hexyl acrylate, and the like), alkyl methacrylate (hexyl methacrylate, 2-ethylhexyl methacrylate, n-lauryl methacrylate, and the like), and the like. As the alkyl (meth) acrylate (f), one type may be used alone, or two or more types may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate, triallyl isocyanurate, and the like. As the polyfunctional monomer (g), one type may be used alone, or two or more types may be used in combination.

Examples of the composite structure of the diene-acrylic composite rubber include a core-shell structure in which a periphery of the diene component is covered with an acrylic rubber component; a core-shell structure in which a periphery of the acrylic rubber component is covered with a diene component; a structure in which the diene component and the acrylic rubber component are mutually intertwined; a copolymerization structure in which a diene-based monomer unit and an alkyl (meth) acrylate-based monomer unit are randomly arranged, and the like.

(Silicone-acrylic Composite Rubber)

The silicone component of the silicone-acrylic composite rubber is based on polyorgansiloxane as a main component. As the silicone component, a polyorganosiloxane containing a vinyl polymerizable functional group is preferable.

The acrylic rubber component of the silicone-acrylic composite rubber is the same as the acrylic rubber component of the diene-acrylic composite rubber.

Examples of the composite structure of the silicone-acrylic composite rubber include a core-shell structure in which a periphery of the silicone component is covered with an acrylic rubber component; a core-shell structure in which a periphery of an acrylic rubber component is covered with a silicone component; a structure in which a silicone component and an acrylic rubber component are intertwined; a structure in which a segment of the polyorganosiloxane and a segment of the polyalkyl (meth) acrylate are linearly and sterically bonded to each other to form a net-like rubber structure; and the like.

(Method of Manufacturing Rubbery Polymer (G1))

The rubbery polymer (G1) is prepared, for example, by emulsion polymerization of a monomer capable of forming the rubbery polymer (G1) in the presence of a radical polymerization initiator. According to the preparation method by the emulsion polymerization method, the particle diameter of the rubbery polymer (G1) can be easily controlled.

The average particle diameter of the rubbery polymer (G1) is preferably 0.1 to 0.6 μm from the viewpoint of further enhancing the impact resistance of the molded article.

<Monomer Mixture (m1)>

The monomer mixture (m1) contains an aromatic alkenyl compound (hereinafter, referred to as monomer (a)) and a vinyl cyanide compound (hereinafter, referred to as monomer (b)). If necessary, the monomer mixture may further contain other monomer (hereinafter, referred to as monomer (c)) copolymerizable with the monomer (a) and the monomer (b).

Examples of the monomer (a) include styrene, α-methylstyrene, vinyl toluene, and the like, and styrene is preferable.

Examples of the monomer (b) include acrylonitrile, methacrylonitrile, and the like, and acrylonitrile is preferable.

Examples of the monomer (c) include alkyl methacrylate (methyl methacrylate, ethyl methacrylate, 2-ethylhexyl methacrylate, and the like), alkyl acrylate (methyl acrylate, ethyl acrylate, butyl acrylate, and the like), maleimide compound (N-phenyl maleimide, and the like), and the like.

From the viewpoint of excellent balance between the impact resistance of the molded article and the moldability of the reinforced thermoplastic resin composition, the proportion of each monomer in the monomer mixture (m1) is preferably such that the proportion of the monomer (a) unit is 50% to 90% by mass, the proportion of the monomer (b) unit is 10% to 50% by mass, and the proportion of the other monomer (c) unit is 0% to 40% by mass (here, the total of the monomers (a) to (c) is 100% by mass).

<Graft Copolymer (G)>

The graft copolymer (G) is obtained by polymerizing the monomer mixture (m1) in the presence of the rubbery polymer (G1). That is, the graft copolymer (G) is one obtained by grafting a molecular chain (G2) formed from the monomer mixture (m1) to the rubbery polymer (G1). As the graft copolymer (G), one type may be used alone, or two or more types may be used in combination.

The content of the rubbery polymer (G1) is preferably 0.5% to 3.5% by mass of the resin main component (C) (100% by mass). When the content of the rubbery polymer (G1) is 0.5% by mass or more, the impact resistance of the molded article can be further enhanced. When the content of the rubbery polymer (G1) is 3.5% by mass or less, the moldability of the reinforced thermoplastic resin composition is further improved and the appearance of the molded article is improved.

The molecular chain (G2) has a monomer (a) unit and a monomer (b) unit as an essential component, and has other monomer (c) unit copolymerizable therewith as an optional component. The preferable range of the proportion (% by mass) of each monomer unit in the molecular chain (G2) is the same as the preferable range of the proportion of each monomer in the monomer mixture (m1).

It is preferable that the graft copolymer (G) contains 1% to 30% by mass of acetone-soluble component and has a reduced viscosity of 0.3 to 0.7 dl/g as measured at 25° C. using an N,N-dimethylformamide solution of 0.2 g/dl of the acetone-soluble component.

When the acetone-soluble component is 30% by mass or less (acetone-insoluble component is 70% by mass or more), the surface appearance of the molded article is improved, and the moldability of the reinforced thermoplastic resin composition is further improved. When the acetone-soluble component is 1% by mass or more (acetone-insoluble component is 99% by mass or less), the tearing strength of the molded article is improved.

When the reduced viscosity of the acetone-soluble component is 0.3 dl/g or more, the tearing strength of the molded article is improved. When the reduced viscosity of the acetone-soluble component is 0.7 dl/g or less, the moldability of the reinforced thermoplastic resin composition is further improved and the surface appearance of the obtained molded article is improved.

The method of measuring the acetone-soluble component is as follows.

2.5 g of the graft copolymer is immersed in 90 ml of acetone, and heated at 65° C. for 3 hours, and thereafter centrifuged at 1500 rpm for 30 minutes using a centrifugal separator. Thereafter, the supernatant is removed, the residue is dried in a vacuum dryer at 65° C. for 12 hours, and the dried sample is precisely weighed. From the mass difference (2.5 g–the mass of the sample after drying), the proportion (%) of the acetone-soluble component in the graft copolymer can be determined.

The reduced viscosity of the acetone-soluble component is measured at 25° C. using an N,N-dimethylformamide solution of 0.2 g/dl.

The acetone-soluble component is a polymer similar to the molecular chain (G2) and is a polymer not grafted to the rubbery polymer (G1). The acetone-soluble component is simultaneously produced when the molecular chain (G2) is grafted to the rubbery polymer (G1) in many cases. Therefore, the graft copolymer (G) contains the acetone-soluble component and the acetone-insoluble component.

Incidentally, it is difficult for the graft copolymer (G) to specify how the rubbery polymer (G1) and the monomer mixture (m1) are polymerized. That is, there are circumstances (impossible or impractical circumstances) where it is impossible or not practical to directly specify the graft copolymer (G) by the structure or properties.

(Method of Manufacturing Graft Copolymer (G))

The graft copolymer (G) is obtained by graft polymerization of the monomer mixture (m1) in the presence of the rubbery polymer (G1).

As a graft polymerization method, an emulsion polymerization method is preferable. In addition, in the graft polymerization, various chain transfer agents may be added in order to adjust the molecular weight of the graft copolymer (G), the graft ratio, and the reduced viscosity of the acetone-soluble component.

<Resin Main Component (C)>

The resin main component (C) contains 80% to 100% by mass of the polycarbonate resin (A) and 0% to 20% by mass of the graft copolymer (G) (herein, the total of polycarbonate resin (A) and graft copolymer (G) is 100% by mass), preferably contains 80% to 95% by mass of the polycarbonate resin (A) and 5% to 20% mass of the graft copolymer (G), and more preferably contains 90% to 95% by mass of the polycarbonate resin (A) and 5% to 10% by mass of the graft copolymer (G).

When the proportion of the polycarbonate resin (A) is within the above range, the reinforced thermoplastic resin composition has good impact resistance. In particular, when the proportion of the polycarbonate resin (A) is a lower limit value of the above range or more, the flame retardancy, mechanical strength, and rigidity of the molded article are increased, and when the proportion is an upper limit value or less, the moldability of the reinforced thermoplastic resin composition is further improved.

When the proportion of the graft copolymer (G) is within the above range, the moldability of the reinforced thermoplastic resin composition is improved. In particular, when the proportion of the graft copolymer (G) is the upper limit value of the above range or less, the flame retardancy, mechanical strength, and rigidity of the molded article are increased, and when the proportion is the lower limit value or more, the moldability of the reinforced thermoplastic resin composition is further improved.

<Polyethylene Terephthalate Resin (B)>

Polyethylene terephthalate (hereinafter, referred to as PET) resin (B) is obtained by solid-phase polymerization of recycled and/or repelletized PET resin. Specifically, examples thereof include a resin obtained by solid-phase polymerization of recycled PET resin, repelletized PET resin, recycled and repelletized PET resin, and the like.

The recycled PET resin is a resin obtained by recovering and regenerating a PET resin product obtained through a molding process of PET resin. As the PET resin product, a used PET bottle, a food tray or the like is representative, but it is not limited thereto, and it is possible to cover off-grade of the PET resin product and waste materials generated in the molding process. Therefore, by using recycled and/or repelletized polyethylene terephthalate resin (B), resources can be effectively utilized.

For recycled materials obtained by collecting used PET bottles, food trays, and the like, it is necessary to avoid mixing of different materials and metals by sorting.

In addition, in a case of washing with alkaline water or the like, a drying treatment is necessary after significantly washing with water so as not to leave an alkali component for promoting hydrolysis of the PET resin.

A shape of the recycled PET resin is normally in a form of a flake, and the average particle diameter is preferably 2 to 5 mm. In addition, a once pelletized (repelletized) resin may be used for foreign matter removal.

Examples of the repelletized PET resin include a resin obtained by pelletizing the recycled PET resin, a resin obtained by pelletizing a commercially available pelletized product (virgin material), and the like. Pelletization can be performed using an extruder or the like.

As the PET resin (B), one type may be used alone, or two or more types may be used in combination.

<Inorganic Filler (D)>

Examples of the inorganic filler (D) include inorganic fiber such as glass fiber and carbon fiber, inorganic fiber coated with metal, inorganic substance such as wollastonite, talc, mica, glass flake, glass bead, potassium titanate, calcium carbonate, magnesium carbonate, carbon black, and ketjen black, metal or alloy such as iron, copper, zinc, and aluminum, fibers and powders of oxides thereof, and the like. Among these, glass fiber or carbon fiber is preferably used since high rigidity can be obtained with less blending.

The surface of the above inorganic fiber, the inorganic fiber coated with metal, an inorganic substance, metal and alloy, and fibers and powders of these oxides may be treated with a known coupling agent (for example, a silane-based coupling agent and a titanate-based coupling agent) or other surface treatment agent.

In addition, the glass fiber and the carbon fiber may be coated or bundled with thermoplastic resins such as ethylene/vinyl acetate copolymer and polyamide, a polyurethane resin, and a thermosetting resin such as an epoxy resin.

The ratio (major axis/minor axis) of the major axis to the minor axis in the fiber cross-section of the glass fiber and the carbon fiber is preferably 2 to 6, and more preferably 2 to 4, respectively. When the major axis/minor axis is 2 or more, good impact properties and strength can be obtained. When the major axis/minor axis is 6 or less, good shaping workability (extrusion workability) can be obtained.

The major axis/minor axis in the fiber cross section is obtained by, for example, observing the fiber cross section at 8 points using an electron microscope, and averaging the major axis/minor axis at the 8 points. In a case where a commercially available product is used, the catalog value may be used.

The glass fiber or the carbon fiber may be either long fibers or short fibers. As the glass fiber and the carbon fiber, short fibers having little anisotropy are preferable, and chopped fibers are more preferable.

As the inorganic filler (D), one type may be used alone, or two or more types may be used in combination.

<Glycidyl Ether Unit-Containing Polymer (E)>

The glycidyl ether unit-containing polymer (E) is a polymer having a glycidyl ether unit in the molecule.

The glycidyl ether unit-containing polymer (E) preferably has no halogen atom (such as bromine). In addition, the glycidyl ether unit-containing polymer (E) is preferably not a block type polymer.

Examples of the glycidyl ether unit-containing polymer (E) include a glycidyl ether type epoxy resin obtained by reacting a compound having a hydroxy group with epichlorohydrin.

Examples of the glycidyl ether type epoxy resin include a bisphenol type epoxy resin; a novolak type epoxy resin; polyglycidyl ether of aliphatic polyhydric alcohol; a biphenyl type epoxy resin and the like having a molecular chain having a unit represented by the following formula (1) in the molecule (for example, an epoxy group-containing phenoxy resin), and the like.

Chemical Formula 1

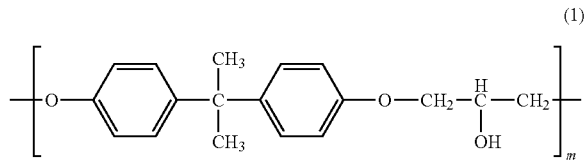

Here, m is an integer of 1 or more.

Examples of the bisphenol type epoxy resin include a bisphenol A type epoxy resin, a bisphenol F type epoxy resin, a bisphenol AD type epoxy resin, an epoxy resin having a structure of bisphenol A and bisphenol F, and the like.

Examples of the novolak type epoxy resin include a phenol novolak type epoxy resin, a cresol novolak type epoxy resin, and the like.

Examples of polyglycidyl ether of aliphatic polyhydric alcohol include alkylene glycol diglycidyl ether (for example, ethylene glycol diglycidyl ether, and the like), polyoxyalkylene glycol diglycidyl ether (for example, diethylene glycol diglycidyl ether, polyethylene glycol diglycidyl ether, dipropylene glycol diglycidyl ether, tripropylene glycol diglycidyl ether, polypropylene glycol diglycidyl ether, and the like), glycerin triglycidyl ether, and the like.

The glycidyl ether unit-containing polymer (E) is preferably a bisphenol A type epoxy resin, a bisphenol F type epoxy resin, an epoxy resin having a structure of bisphenol A and bisphenol F, a phenol novolak type epoxy resin, a cresol novolak type epoxy resin, and an epoxy group-containing phenoxy resin, from the viewpoint of further enhancing the mechanical strength of the molded article.

The glycidyl ether unit-containing polymer (E) may be in a liquid state, may be in a semisolid state, or may be in a solid state at room temperature (20° C.). The polymer is preferably solid in consideration of workability in mixing and kneading.

As the glycidyl ether unit-containing polymer (E), one type may be used alone, or two or more types may be used in combination.

The mass average molecular weight of the glycidyl ether unit-containing polymer (E) is preferably 3,800 to 60,000, and more preferably 5,500 to 50,000. When the mass average molecular weight of the glycidyl ether unit-containing polymer (E) is 3,800 or more, the impact resistance of the molded article is enhanced. When the mass average molecular weight of the glycidyl ether unit-containing polymer (E) is 60,000 or less, the moldability of the reinforced thermoplastic resin composition and the flame retardancy of the molded article is improved.

The mass average molecular weight of the glycidyl ether unit-containing polymer (E) can be determined by a mass spectrometry method. In a case where a commercially available glycidyl ether unit-containing polymer (E) is used, the catalog value may be used.

As the glycidyl ether unit-containing polymer (E), a commercially available product may be used, or a product manufactured by a known manufacturing method may be used.

Examples of commercially available products of the glycidyl ether unit-containing polymer (E) include jER (registered trademark) series manufactured by Mitsubishi Chemical Corporation, Epotote (registered trademark) series and Phenototo series (registered trademark) manufactured by Nippon Steel Sumikin Kagaku Co., Ltd., AER (registered trademark) series manufactured by Asahi Kasei E-Materials Co., Ltd., Epiclon (registered trademark) series manufactured by DIC Corporation, and the like.

<Phosphate Ester-Based Flame Retardant (F)>

As the phosphate ester-based flame retardant (F), a known flame retardant can be used, and for example, a compound represented by the following formula (2) can be mentioned.

Chemical Formula 2

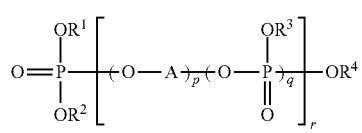

Here, $R^1$, $R^2$, $R^3$, and $R^4$ are each independently a hydrogen atom or a monovalent organic group, and all of the $R^1$, $R^2$, $R^3$, and $R^4$ are not hydrogen atoms simultaneously, A is an organic group of (q+1) valent, P is 0 or 1, q is an integer of 1 or more, and r is an integer of 0 or more.

Examples of the monovalent organic group include an alkyl group which may be substituted (for example, methyl group, ethyl group, butyl group, octyl group, and the like), a cycloalkyl group (for example, a cyclohexyl group, and the like), an aryl group (for example, a phenyl group, an alkyl group-substituted phenyl group, and the like), and the like. There is no limit to the number of substituents when substituted. Examples of the substituent include an alkoxy group, an alkylthio group, an aryloxy group, an arylthio group, and the like. The substituted organic group may be a group formed by combining two or more of these substituents (for example, an arylalkoxylalkyl group, or the like), or may be a group combination of these substituents bonded with an oxygen atom, a nitrogen atom, a sulfur atom, or the like (for example, an arylsulfonylaryl group, or the like).

Examples of the (q+1) valent organic group include a functional group having a structure in which q of hydrogen atoms bonded to carbon atoms are removed from the above monovalent organic group. The position of the carbon atom from which the hydrogen atom is removed is optional. Specific examples of the (q+1) valent organic group include an alkylene group, a (substituted) phenylene group, and the like.

Specific examples of the phosphate ester-based flame retardant (F) include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethyl-cresyl phosphate, tris (isopropylphenyl) phosphate, resorcinol diphenyl phosphate, polyphosphate, and the like.

Examples of the polyphosphate include bisphenol A bisphosphates, hydroquinone bisphosphate, resorcinol bisphosphate, trioxybenzene triphosphate, bisphenol A bis (dicresyl phosphate), bisphenol A bis (diphenyl phosphate), phenylene bis (diphenyl phosphate), phenylene bis (ditolyl phosphate), or phenylene bis (dixylyl phosphate), and the like.

The polyphosphate is obtained by dehydration condensation of various diol compounds such as polynuclear phenols (for example, bisphenol A group, and the like) with orthophosphoric acid. Examples of the diol include hydroquinone, resorcinol, diphenylol methane, diphenylol dimethyl methane, dihydroxy biphenyl, p,p'-dihydroxydiphenyl sulfone, dihydroxynaphthalene, and the like.

As the phosphate ester-based flame retardants (F), triphenyl phosphate, bisphenol A bis (diphenyl phosphate), phenylene bis (diphenyl phosphate), and phenylene bis (dixylyl phosphate) are preferable among these.

The mass average molecular weight of the phosphate ester-based flame retardant (F) is preferably 326 or more, more preferably 327 or more, and particularly preferably 550 or more. When a phosphate ester-based flame retardant (F) having a mass average molecular weight of 326 or more, particularly 327 or more is used, the moldability of the reinforced thermoplastic resin composition is improved, and a molded article having excellent appearance can be obtained.

The mass average molecular weight of the phosphate ester-based flame retardant (F) is preferably 692 or less, more preferably 690 or less, and particularly preferably 686 or less, from the viewpoint of flame retardancy of the molded article.

The mass average molecular weight of the phosphate ester-based flame retardant (F) can be determined by a mass spectrometry method. In a case where a commercially available phosphate ester-based flame retardant (F) is used, the catalog value may be used.

As the phosphate ester-based flame retardant (F), a commercially available product may be used, or a phosphate ester-based flame retardant manufactured by a known manufacturing method may be used.

Examples of commercially available products of the phosphate ester-based flame retardant (F) include FP series manufactured by ADEKA Corporation, Cronitex (registered trademark) series manufactured by Ajinomoto Fine Techno Co., Ltd., Rheophos (registered trademark) series manufactured by Kemushura Japan Co., CR series and PX series manufactured by Daihachi Chemical Industry Co., Ltd., and the like.

<Flame Retardant Aid (H)>

The flame retardant aid (H) is a component for preventing dripping of the reinforced thermoplastic resin composition during combustion. Examples of the flame retardant aid (H) include polytetrafluoroethylene, a copolymer having a tetrafluoroethylene unit, a silicone-based polymer, and the like.

<Other Flame Retardant (I)>

As other flame retardant (I) other than the phosphate ester-based flame retardant (F), various known flame retardants can be used, and non-halogen-based flame retardants other than the phosphate ester-based flame retardant (F) are preferable.

Examples of the non-halogen-based flame retardant include a phosphazene compound, a phosphorus-containing polyester, an inorganic flame retardant (red phosphorus, aluminum hydroxide), and the like.

As the red phosphorus-based flame retardant, a retardant stabilized by being coated with a thermosetting resin, or a retardant stabilized by being coated with the thermosetting resin and metal hydroxide is used. Since the red phosphorus-based flame retardant alone is ignitable, it may be mixed with at least a portion of the resin main component (C) or the polycarbonate resin (A) in advance to form a master batch.

<Other Components>

Examples of other components include other modifiers, release agents, stabilizers against light or heat, antistatic agents, dyes, pigments, and the like.

<Content of Each Component>

The content of the PET resin (B) in the reinforced thermoplastic resin composition is 5 to 20 parts by mass, and preferably 5 to 10 parts by mass with respect to 100 parts by mass of the resin main component (C). When the content of the PET resin (B) is 5 parts by mass or more and 20 parts by mass or less, excellent impact resistance is obtained.

The content of the inorganic filler (D) is 20% to 50% by mass, preferably 30% to 45% by mass, based on 100% by mass of the reinforced thermoplastic resin composition. When the content of the inorganic filler (D) is 20% by mass or more, the rigidity of the molded article are enhanced. When the content of the inorganic filler (D) is 50% by mass or less, the moldability of the reinforced thermoplastic resin composition is improved.

The content of the glycidyl ether unit-containing polymer (E) is preferably from 1 to 10 parts by mass, and more preferably from 3 to 8 parts by mass with respect to 100 parts by mass of the resin main component (C). When the content of the glycidyl ether unit-containing polymer (E) is 1 part by mass or more, the impact resistance of the molded article is enhanced. When the content of the glycidyl ether unit-containing polymer (E) is 10 parts by mass or less, the moldability of the reinforced thermoplastic resin composition and the flame retardancy of the molded article is improved.

The content of the phosphate ester-based flame retardant (F) is preferably from 0 to 25 parts by mass, more preferably from 1 to 25 parts by mass, and still more preferably from 1 to 23 parts by mass with respect to 100 parts by mass of the resin main component (C). When the content of the phosphate ester-based flame retardant (F) is 25 parts by mass or less, the impact resistance and heat resistance of the molded article are enhanced. When the content of the phosphate ester-based flame retardant (F) is 1 part by mass or more, the flame retardancy and moldability of the molded article are further improved.

In a case where the reinforced thermoplastic resin composition contains the copolymer having polytetrafluoroethylene or tetrafluoroethylene unit as the flame retardant aid (H), the content of the flame retardant aid (H) is preferably 1 part by mass or less with respect to 100 parts by mass of the resin main component (C) from the viewpoint of the surface appearance of the molded article. Although the lower limit is not particularly limited, it is preferably 0.1 parts by mass or more with respect to 100 parts by mass of the resin main component (C) from the viewpoint that the effect of the flame retardant aid (H) can be easily obtained.

<Method of Manufacturing Reinforced Thermoplastic Resin Composition>

The reinforced thermoplastic resin composition of the present invention is obtained by blending the resin main component (C) (polycarbonate resin (A) and as necessary graft polymer (G)), the PET resin (B) obtained by solid-phase polymerization of those recycled and/or repelletized, the inorganic filler (D), the glycidyl ether unit-containing polymer (E), as necessary, the phosphate ester-based flame retardant (F), the flame retardant aid (H), the flame retardant (I) other than the phosphate ester-based flame retardant (F), and other components. Specifically, the reinforced thermoplastic resin composition can be obtained by mixing each of the components using a mixing device (for example, a Henschel mixer, a tumbler mixer, a Nauta mixer, or the like). Furthermore, kneading may be performed using a kneading apparatus (for example, a single screw extruder, a twin screw extruder, a Banbury mixer, a co-kneader, or the like).

<Function and Effect>

Since the reinforced thermoplastic resin composition of the present invention described above contains the resin main component (C), the PET resin (B) obtained by solid-phase polymerization of those recycled and/or repelletized, the inorganic filler (D), the glycidyl ether unit-containing polymer (E) having a specific mass average molecular weight, and the phosphate ester-based flame retardant (F) at a specific ratio, the moldability is improved and the rigidity, the impact resistance, the mechanical strength, the heat resistance, the flame retardancy, and the weld strength of the obtained molded article can be enhanced.

In addition, since moldability is improved, an appearance defect such as silver streaks is unlikely to occur in the obtained molded article.

<Molded Article>

The molded article of the present invention is a molded article of the reinforced thermoplastic resin composition of the present invention.

Examples of the molding processing method of the reinforced thermoplastic resin composition include an injection molding method (including insert molding for producing films or glass plates), an injection compression molding method, an extrusion method, a blow molding method, a vacuum forming method, an air pressure molding method, a calendar molding method, an inflation molding method, and the like. Among these, the injection molding method and the injection compression molding method are preferable from the viewpoint that these are excellent in mass productivity and a molded article with high dimensional accuracy can be obtained.

In the molded article of the present invention, since the reinforced thermoplastic resin composition of the present invention is used, it has high rigidity, impact resistance, mechanical strength, heat resistance, and flame retardancy. In addition, the appearance is improved.

For example, the molded article of the present invention can be applied to housings such as a personal computer (including a notebook type and a tablet type), a projector (including a liquid crystal projector), a television, a printer, a facsimile, a copying machine, an audio device, a game machine, a camera (including a video camera, a digital camera, and the like), video equipment (video, and the like), musical instruments, mobile equipment (an electronic organizer, an information portable terminal (PDA), and the like), lighting equipment, communication equipment (telephones (including mobile phones and smart phones), and the like), and the like, fishing tackle, play equipment (pachinko goods, and the like), products for vehicle, products for furniture, sanitary products, products for building materials, and the like. Among these applications, it is suitable for a housing of a mobile device (such as a notebook type or tablet type personal computer and a mobile device including a smart phone) from the viewpoint that the effects of the present invention are particularly exhibited.

EXAMPLES

Hereinafter, specific examples will be described below. However, the present invention is not limited to these examples.

"Parts" and "%" described below mean "parts by mass" and "% by mass" unless otherwise specified.

The methods used for various measurements and evaluations and the components used are as follows.

<Measurement Method and Evaluation Method>

Acetone-Soluble Component 2.5 g of the graft copolymer was immersed in 90 ml of acetone and heated at 65° C. for 3 hours, and thereafter centrifuged at 1500 rpm for 30 minutes using a centrifugal separator. Thereafter, the supernatant was removed and the residue was dried in a vacuum dryer at 65° C. for 12 hours, and thus the dried sample was precisely weighed. From the mass difference (2.5 g−mass of the sample after drying (g)), the proportion (%) of the acetone-soluble component in the graft copolymer was determined. The reduced viscosity of the acetone-soluble component was measured at 25° C. using an N,N-dimethylformamide solution of 0.2 g/dl.

Charpy Impact Strength

The Charpy impact strength was measured in accordance with ISO 179-1: 2013 version.

Flexural Strength and Flexural Modulus

The flexural strength and the flexural modulus were measured in accordance with ISO 178: 2013 version. The flexural strength is an index of the mechanical strength of the molded article, and the flexural modulus is an index of the rigidity of the molded article.

Heat Resistance

A deflection temperature under 1.80 MPa load and a flat wise method was measured in accordance with ISO 75-2: 2013 version.

Moldability

A liquid crystal display cover (thickness 1 mm) of a laptop personal computer having A4 size was molded. The moldability was evaluated based on the presence or absence of short shots (unfilled portion), and the presence or absence of sink marks, silver streaks, and gas burning during molding.

A: There was no unfilled, sink marks, or gas burning.
B: Sink marks were partially seen.
C: It was unfilled, or gas burning or silver streaks were seen.

Flame Retardancy

A reinforced thermoplastic resin composition was molded by injection molding to prepare a test piece (width 12.7 mm, length 127 mm, and thickness 2.0 mm), and flame retardancy was evaluated in accordance with UL 94 as follows.

The burner flame was applied to the lower end of the test piece supported vertically and held for 10 seconds, and thereafter the burner flame was separated from the test piece. After the flame disappeared, the burner flame was again applied and the same operation was performed. Depending on a flaming combustion duration time after the first flame ignition, the total of the second flaming combustion duration time and flameless combustion duration time, and the presence or absence of a combustion falling object, it was determined that whether or not it is equivalent to V-1 in UL 94, and flame retardancy was evaluated according to the following evaluation criteria. The standard of V-1 is "first flaming combustion duration time is longer than 10 seconds and shorter than 30 seconds, the total of second flaming combustion duration time and flameless combustion duration time is longer than 30 seconds and shorter than 60 seconds, and there is no combustion falling object.

A: It had flame retardancy of V-1 level.
B: It did not have flame retardancy of V-1 level.

Weld Strength

A liquid crystal display cover (thickness 1 mm) of an A4 size notebook type personal computer was molded under molding conditions of a molding temperature of 290° C., an injection speed of 99%, and a mold temperature of 90° C. by an injection molding machine (J350E, with 350t accumulator, manufactured by Japan Steel Works, Ltd.). The weld in the molded article was pushed with a one-point terminal and the test force (N) at the time of crack occurrence was measured, and thus this value was regarded as the weld strength.

<Each Component>
Polycarbonate Resin (A)
Novallex 7021PJ (viscosity average molecular weight: 18,800) manufactured by Mitsubishi Engineering-Plastics Corporation was used as the polycarbonate resin (A-1).

Manufacturing of Graft Copolymer (G-1)

Copolymer latex (2 parts as solid content) having an average particle diameter of 0.08 μm and including 85% n-butyl acrylate unit and 15% methacrylic acid unit was added with stirring to polybutadiene latex (100 parts as solid content) having a solid content concentration of 35% and an average particle diameter of 0.08 μm. Stirring was continued for 30 minutes to obtain an enlarged butadiene-based rubbery polymer (G1-1) latex having an average particle diameter of 0.28 μm.

The obtained enlarged butadiene-based rubbery polymer (G1-1) latex was charged in a reactor, and 100 parts of distilled water, 4 parts of wood rosin emulsifier, 0.4 parts of DEMOL N (naphthalene sulfonic acid formalin condensate manufactured by Kao Corporation), 0.04 parts of sodium hydroxide, and 0.7 parts of dextrose were added. This mixture was heated while stirring, and 0.1 parts of ferrous sulfate, 0.4 parts of sodium pyrophosphate, and 0.06 parts of sodium dithionite were added at the time of the internal temperature of 60° C. Thereafter, a mixture containing the following components was continuously added dropwise over 90 minutes, subsequently held for 1 hour and cooled to obtain a graft copolymer (G-1) latex.

Acrylonitrile 30 parts
Styrene 70 parts
Cumene hydroperoxide 0.4 parts
tert-Dodecyl mercaptan 1 part The obtained graft copolymer (G-1) latex was coagulated with dilute sulfuric acid, washed, filtered, and dried to obtain a dry powder of the graft copolymer (G-1). The acetone-soluble component content of the graft copolymer (G-1) was 27%. In addition, the reduced viscosity of the acetone-soluble component was 0.3 dl/g.

Manufacturing of Graft Copolymer (G-2)

The raw materials were charged into the reactor in the following proportions, and polymerized while stirring at 50° C. for 4 hours under nitrogen substitution to obtain a rubbery polymer (G1-2) latex.

n-Butyl acrylate 98 parts
1,3-Butylene glycol dimethacrylate 1 part
Allyl methacrylate 1 part
Sodium dioctylsulfosuccinate 2.0 parts
Deionized water 300 parts
Potassium persulfate 0.3 parts
Disodium phosphate 12-hydrate 0.5 parts
Sodium hydrogenphosphate 12-hydrate 0.3 parts The obtained rubbery polymer (G1-2) latex (100 parts as a solid content) was charged in the separate reactor, diluted with 280 parts of ion exchanged water, and heated to 70° C.

Separately from the above, 0.7 parts of benzoyl peroxide was dissolved in 100 parts of a monomer mixture including acrylonitrile/styrene=29/71 (mass ratio) and was substituted with nitrogen. Thereafter, the monomer mixture was added to the reactor containing the rubbery polymer (G1-2) latex at a rate of 30 parts/hour by a metering pump. After all the monomer mixture was added, the temperature in the reactor was raised to 80° C. and stirring was continued for 30 minutes to obtain graft copolymer (G-2) latex. The polymerization rate was 99%.

The graft copolymer (G-2) latex was charged into a coagulation tank charged with a 0.15% aqueous solution (90° C.) of aluminum chloride ($AlCl_3 \cdot 6H_2O$) three times the amount of the entire latex and was coagulated. After the entire latex was added, the temperature in the coagulation tank was raised to 93° C., and the temperature was allowed to keep for 5 minutes. After cooling, this mixture was drained and washed with a centrifugal separator and then dried to obtain a dry powder of the graft copolymer (G-2).

The acetone-soluble component content of the graft copolymer (G-2) was 21%. In addition, the reduced viscosity of the acetone-soluble component was 0.70 dl/g.

Manufacturing of Graft Copolymer (G-3)

A graft copolymer (G-3) having a rubbery polymer (G1-3) as a composite rubber of polybutadiene/polybutyl acrylate was obtained by the following method.

To the polybutadiene latex (20 parts as solid content) having a solid content concentration of 35% and an average particle diameter of 0.08 μm, a copolymer latex (0.4 parts as solid content) including 82% of n-butyl acrylate unit and 18% methacrylic acid unit and having an average particle diameter of 0.10 μm was added while stirring. This mixture was stirred for 30 minutes to obtain an enlarged diene-based rubber latex having an average particle diameter of 0.36 μm.

The obtained enlarged diene-based rubber latex (20 parts as solid content) was charged in a reactor, 1 part of disproportionated potassium rosinate, 150 parts of ion-exchanged water, and a monomer mixture having the following composition were added, was substituted with nitrogen, and the temperature was raised to 50° C. (internal temperature).

n-Butyl acrylate 80 parts
Allyl methacrylate 0.32 parts
Ethylene glycol dimethacrylate 0.16 parts Furthermore, in the reactor, a solution prepared by dissolving 0.0002 parts of ferrous sulfate, 0.0006 parts of disodium ethylenediaminetetraacetate, and 0.25 parts of Rongalite was added in 10 parts of ion-exchanged water and reacted. The internal temperature at the end of the reaction was 75° C. Furthermore, the temperature was raised to 80° C. and the reaction was continued for 1 hour to obtain a rubbery polymer (G1-3) latex including the composite rubber of enlarged diene-based rubber and polybutyl acrylate-based rubber. The polymerization rate was 98.8%.

The rubbery polymer (G1-3) latex (50 parts as a solid content) was charged in the reactor, 140 parts of ion exchanged water was added and diluted, and the temperature was raised to 70° C.

Separately from this, 0.35 part of benzoyl peroxide was dissolved in 50 parts of a monomer mixture including acrylonitrile/styrene=29/71 (mass ratio) and was substituted with nitrogen. The monomer mixture was added to the reactor containing the rubbery polymer (G1-3) latex at a rate of 15 parts/hour by a metering pump. After all of the monomer mixture was added, the temperature in the reactor was raised to 80° C. and stirring was continued for 30 minutes to obtain a graft copolymer (G-3) latex. The polymerization rate at this time was 99%.

The graft copolymer (G-3) latex was introduced into a coagulation tank charged with a 0.5% aqueous solution of sulfuric acid (90° C.) three times the amount of the entire latex while stirring to coagulate. After the entire latex was added, the temperature inside the coagulation tank was raised to 93° C., the solution was allowed to keep for 5 minutes. After cooling, this mixture was drained and washed with a centrifugal separator and then dried to obtain a dry powder of the graft copolymer (G-3).

The acetone-soluble component content of the graft copolymer (G-3) was 20%. In addition, the reduced viscosity of the acetone-soluble component was 0.7 dl/g.

PET Resin (B)

As the PET resin (B-1) obtained by solid-phase polymerization of the recycled PET resin, SC-31H manufactured by Utsumi Recycle Systems Co., Ltd. was used.

As recycled PET resin (B-2), UK-31 manufactured by Utsumi Recycle Systems Co., Ltd. was used.

As a repelletized PET resin (B-3), GM 502S manufactured by Mitsubishi Chemical Corporation was repelletized at 260° C. by a twin-screw extruder was used.

As the PET resin (B-4) which was neither recycled nor repelletized, GM 502S manufactured by Mitsubishi Chemical Corporation was used.

Inorganic Filler (D)

As an inorganic filler (D-1), carbon fiber chopped fiber (TR06U, manufactured by Mitsubishi Rayon Co., Ltd., surface treatment agent: polyurethane) was used.

As an inorganic filler (D-2), glass fiber chopped fiber (CSG3PA-820, manufactured by Nitto Boseki Co., surface treatment agent: polyurethane, the ratio of major axis/minor axis: 4) was used.

As an inorganic filler (D-3), glass fiber chopped fiber (CSH3PA-870, manufactured by Nitto Boseki Co., surface treatment agent: polyurethane, the ratio of major axis/minor axis: 2) was used.

As an inorganic filler (D-4), glass fiber chopped fiber (CSH3PA-850, manufactured by Nitto Boseki Co., surface treatment agent: epoxy resin, the ratio of major axis/minor axis: 2) was used.

As an inorganic filler (D-5), glass fiber chopped fiber (CS3PE-455, manufactured by Nitto Boseki Co., Ltd., surface treatment agent: polyurethane, the ratio of major axis/minor axis: 1) was used.

Glycidyl Ether Unit-Containing Polymer (E)

As a glycidyl ether unit-containing polymer (E-1), an epoxy group-containing phenoxy resin (manufactured by Mitsubishi Chemical Corporation, jER 4250, mass average molecular weight: 60,000) was used.

As a glycidyl ether unit-containing polymer (E-2), an epoxy group-containing phenoxy resin (manufactured by Mitsubishi Chemical Corporation, jER 1256, mass average molecular weight: 50,000) was used.

As a glycidyl ether unit-containing polymer (E-3), a bisphenol A type epoxy resin (manufactured by Mitsubishi Chemical Corporation, jER 1010, mass average molecular weight: 5,500) was used.

As a glycidyl ether unit-containing polymer (E-4), a bisphenol A type epoxy resin (manufactured by Mitsubishi Chemical Corporation, jER 1009, mass average molecular weight: 3,800) was used.

As a glycidyl ether unit-containing polymer (E-5), a bisphenol A type epoxy resin (manufactured by Mitsubishi Chemical Corporation, jER 1004, mass average molecular weight: 1,650) was used.

The glycidyl ether unit-containing polymer (E-6) was manufactured by the following method.

82.42 parts of a bisphenol A type epoxy resin (epoxy equivalent: 467 g/eq), 6.3 parts of bisphenol A type liquid epoxy resin (epoxy equivalent weight: 210 g/eq, hydrolyzable chlorine: 1.79%), 13.95 parts of bisphenol A, 19.6 parts of p-cumyl phenol, 7.5 parts of polyester resin (GV-335, manufactured by Nippon U-pica Co., Ltd., acid value: 30 KOH mg/g), and 30 parts of xylene was charged into a separable flask having a capacity of 500 ml equipped with a stirrer, a thermometer, a nitrogen inlet, and a cooling tube and heated under a nitrogen atmosphere to raise the temperature.

When the internal temperature of the reaction system reached 80° C., 0.18 parts of a 5% lithium chloride aqueous solution was added and the temperature was further raised. When the internal temperature of the reaction system reached 130° C., the pressure inside the reaction system was reduced and xylene and water were extracted to the outside of the system. Thereafter, the reaction was performed while maintaining the reaction temperature at 160° C., and after 1 hour, nitrogen was introduced into the reaction system to return the internal pressure of the reaction system to normal pressure. After 7 hours from the time when the reaction temperature reached 160° C., 20.25 parts of a high molecular weight bisphenol A type epoxy resin (epoxy equivalent: 2700 g/eq) was added and stirred for 1 hour. Thereafter, 100 parts of polyester resin (GV-730, manufactured by Nippon U-pica Co., Ltd., acid value: 3 KOH mg/g) was added and reacted at 180° C. for 10 hours to obtain a high molecular weight epoxy resin. In order to subject the obtained high molecular weight epoxy resin to molecular weight measurement by GPC, when trying to dissolve 0.1 g of the sample in 10 ml of tetrahydrofuran, approximately 0.05 g was insoluble. After filtering through 5C filter paper, when the filtrate was subjected to molecular weight measurement by GPC, the mass average molecular weight was 70,200.

Phosphate Ester-Based Flame Retardant (F)

As a phosphate ester-based flame retardant (F-1), bisphenol A bis (diphenyl phosphate) (manufactured by Ajinomoto Fine-Techno Co., Ltd., BAPP, mass average molecular weight: 692, catalog value) was used.

As a phosphate ester-based flame retardant (F-2), phenylene bis (dixylyl phosphate) (manufactured by Daihachi Chemical Industry Co., Ltd. PX-200, mass average molecular weight: 686, catalog value) was used.

As a phosphate ester-based flame retardant (F-3), phenylene bis (diphenyl phosphate) (manufactured by Daihachi Chemical Co., Ltd., CR-733S, mass average molecular weight: 574, catalog value) was used.

As a phosphate ester-based flame retardant (F-4), triphenyl phosphate (manufactured by Daihachi Chemical Industry Co., Ltd. TPP, mass average molecular weight: 326, catalog value) was used.

Flame Retardant Aid (H)

As a flame retardant aid (H-1), polytetrafluoroethylene (PTFE) was used.

Examples 1 to 28 and Comparative Examples 1 to 10

Each of the above-described components was blended as illustrated in the following Tables 1 to 5 and kneaded using a twin screw extruder to obtain pellets of a reinforced thermoplastic resin composition. The obtained pellets were dried at 100° C. for 3 hours and then evaluated for the moldability by injection molding. In addition, the Charpy impact strength, the flexural strength, the flexural modulus, the heat resistance, the flame retardancy, and the weld strength of the obtained molded article were measured. Evaluation results are illustrated in Tables 1 to 5.

TABLE 1

| Example No. | | | | 1 | 2 | 3 | 4 | 5 | 6 | 7 | 8 | 9 |
|---|---|---|---|---|---|---|---|---|---|---|---|---|
| C | A | | % | 80 | 100 | 95 | 95 | 95 | 95 | 95 | 95 | 95 |
| | G | G1-1 | % | | | | | | | | | |
| | | G1-2 | % | 20 | | 5 | 5 | 5 | 5 | 5 | 5 | 5 |
| | | G1-3 | % | | | | | | | | | |
| B-1 | | | Parts | 10 | 10 | 10 | 10 | 10 | 10 | 10 | 10 | 10 |
| D-1 | | | Parts | | | 35.5 | | | | | | |
| D-2 | | | Parts | 35.5 | 116.0 | | 35.5 | 60.8 | 141.8 | | | |
| D-3 | | | Parts | | | | | | | 116.0 | | |
| D-4 | | | Parts | | | | | | | | 116.0 | |
| D-5 | | | Parts | | | | | | | | | 116.0 |
| E-1 | | | Parts | | | | | | | | | |
| E-2 | | | Parts | 8 | 8 | 8 | 8 | 8 | 8 | 8 | 8 | 8 |
| E-3 | | | Parts | | | | | | | | | |
| E-4 | | | Parts | | | | | | | | | |
| F-1 | | | Parts | | | | | | | | | |
| F-2 | | | Parts | 23 | 23 | 23 | 23 | 23 | 23 | 23 | 23 | 23 |
| F-3 | | | Parts | | | | | | | | | |
| F-4 | | | Parts | | | | | | | | | |
| H | | | Parts | | | | | 0.8 | | | | |
| Proportion of (D) | | | % | 20 | 45 | 20 | 20 | 30 | 50 | 45 | 45 | 45 |
| Charpy Impact Strength | | | kJ/m$^2$ | 24 | 23 | 18 | 18 | 21 | 24 | 21 | 19 | 17 |
| Flexural Strength | | | MPa | 139 | 251 | 222 | 153 | 201 | 247 | 221 | 199 | 185 |
| Flexural Modulus | | | MPa | 5900 | 15800 | 13600 | 6600 | 10500 | 15100 | 13700 | 13500 | 13200 |
| Heat Resistance | | | 140 | 88 | 102 | 94 | 94 | 98 | 100 | 100 | 100 | 99 |
| Moldability | | | — | A | A | A | A | A | B | A | A | A |
| Flame Retardancy | | | — | B | B | B | B | B | B | B | B | B |
| Weld Strength | | | N | 158 | 204 | 184 | 177 | 185 | 206 | 190 | 176 | 169 |

TABLE 2

| Example No. | | | | 10 | 11 | 12 | 14 | 15 | 16 | 17 | 18 |
|---|---|---|---|---|---|---|---|---|---|---|---|
| C | A | | % | 95 | 95 | 95 | 95 | 95 | 95 | 95 | 95 |
| | G | G1-1 | % | 5 | | | | | | | |
| | | G1-2 | % | | 5 | | 5 | 5 | 5 | 5 | 5 |
| | | G1-3 | % | | | 5 | | | | | |
| B-1 | | | Parts | 10 | 10 | 10 | 5 | 20 | 10 | 10 | 10 |
| D-1 | | | Parts | | | | | | | | |
| D-2 | | | Parts | 116.0 | 116.0 | 116.0 | 111.9 | 124.2 | 110.3 | 111.9 | 117.7 |
| D-3 | | | Parts | | | | | | | | |
| D-4 | | | Parts | | | | | | | | |
| D-5 | | | Parts | | | | | | | | |
| E-1 | | | Parts | | | | | | | | |
| E-2 | | | Parts | 8 | 8 | 8 | 8 | 8 | 1 | 3 | 10 |
| E-3 | | | Parts | | | | | | | | |
| E-4 | | | Parts | | | | | | | | |
| F-1 | | | Parts | | | | | | | | |
| F-2 | | | Parts | 23 | 23 | 23 | 23 | 23 | 23 | 23 | 23 |
| F-3 | | | Parts | | | | | | | | |
| F-4 | | | Parts | | | | | | | | |
| H | | | Parts | | | | 0.8 | | | | |
| Proportion of (D) | | | % | 45 | 45 | 45 | 45 | 45 | 45 | 45 | 45 |
| Charpy Impact Strength | | | kJ/m$^2$ | 25 | 25 | 25 | 19 | 23 | 17 | 19 | 25 |
| Flexural Strength | | | MPa | 227 | 232 | 237 | 226 | 249 | 153 | 160 | 234 |
| Flexural Modulus | | | MPa | 14100 | 14000 | 14000 | 13600 | 15200 | 13600 | 13700 | 14100 |
| Heat Resistance | | | 140 | 100 | 100 | 100 | 99 | 100 | 100 | 100 | 101 |
| Moldability | | | — | A | A | A | A | B | A | A | B |
| Flame Retardancy | | | — | B | B | B | B | B | B | B | B |
| Weld Strength | | | N | 196 | 201 | 203 | 202 | 175 | 154 | 166 | 205 |

TABLE 3

| Example No. | | | | 19 | 20 | 21 | 22 | 23 | 24 | 25 | 26 | 27 | 28 |
|---|---|---|---|---|---|---|---|---|---|---|---|---|---|
| C | A | | % | 95 | 95 | 95 | 95 | 95 | 95 | 95 | 95 | 95 | 95 |
| | G | G1-1 | % | | | | | | | | | | |
| | | G1-2 | % | 5 | 5 | 5 | 5 | 5 | 5 | 5 | 5 | 5 | 5 |
| | | G1-3 | % | | | | | | | | | | |

TABLE 3-continued

| Example No. | | 19 | 20 | 21 | 22 | 23 | 24 | 25 | 26 | 27 | 28 |
|---|---|---|---|---|---|---|---|---|---|---|---|
| B-1 | Parts | 10 | 10 | 10 | 10 | 10 | 10 | 10 | 10 | 10 | 10 |
| D-1 | Parts | | | | | | | | | | |
| D-2 | Parts | 97.2 | 98.0 | 99.7 | 117.7 | 116.0 | 116.0 | 116.0 | 116.0 | 116.0 | 116.0 |
| D-3 | Parts | | | | | | | | | | |
| D-4 | Parts | | | | | | | | | | |
| D-5 | Parts | | | | | | | | | | |
| E-1 | Parts | | | | | | | | 8 | | |
| E-2 | Parts | 8 | 8 | 8 | 8 | 8 | 8 | 8 | | | |
| E-3 | Parts | | | | | | | | | 8 | |
| E-4 | Parts | | | | | | | | | | 8 |
| F-1 | Parts | | | | | | 23 | | | | |
| F-2 | Parts | | 1 | 3 | 25 | | | | 23 | 23 | 23 |
| F-3 | Parts | | | | | | | 23 | | | |
| F-4 | Parts | | | | | | | 23 | | | |
| H | Parts | | | | | 0.8 | | | | | |
| Proportion of (D) | % | 45 | 45 | 45 | 45 | 45 | 45 | 45 | 45 | 45 | 45 |
| Charpy Impact Strength | kJ/m$^2$ | 30 | 29 | 28 | 24 | 24 | 25 | 25 | 25 | 25 | 25 |
| Flexural Strength | MPa | 152 | 154 | 158 | 234 | 232 | 234 | 235 | 242 | 239 | 239 |
| Flexural Modulus | MPa | 10000 | 10100 | 10300 | 14200 | 13800 | 13800 | 13800 | 13900 | 13800 | 13800 |
| Heat Resistance | | 140 | 131 | 130 | 127 | 98 | 100 | 99 | 97 | 100 | 100 | 100 |
| Moldability | — | B | A | A | A | A | A | B | A | A | A |
| Flame Retardancy | — | B | B | B | B | B | B | B | B | B | B |
| Weld Strength | N | 216 | 216 | 213 | 201 | 202 | 201 | 200 | 200 | 202 | 199 |

TABLE 4

| Comparative Example No. | | | | 1 | 2 | 3 | 4 |
|---|---|---|---|---|---|---|---|
| C | A | | % | 75 | 100 | 95 | 95 |
| | G | G1-1 | % | | | | |
| | | G1-2 | % | 25 | | 5 | 5 |
| | | G1-3 | % | | | | |
| B-1 | | | Parts | 10 | 10 | 10 | 10 |
| B-2 | | | Parts | | | | |
| B-3 | | | Parts | | | | |
| B-4 | | | Parts | | | | |
| D-1 | | | Parts | | | | |
| D-2 | | | Parts | | 173.3 | 109.5 | 125.8 |
| D-3 | | | Parts | | | | |
| D-4 | | | Parts | | | | |
| D-5 | | | Parts | 35.5 | | | |
| E-1 | | | Parts | | | | |
| E-2 | | | Parts | 8 | 8 | | 8 |
| E-3 | | | Parts | | | | |
| E-4 | | | Parts | | | | |
| E-5 | | | Parts | | | | |
| E-6 | | | Parts | | | | 12 |
| F-1 | | | Parts | | | | |
| F-2 | | | Parts | 23 | 23 | 23 | 23 |
| F-3 | | | Parts | | | | |
| F-4 | | | Parts | | | | |
| H | | | Parts | | | 0.8 | |
| Proportion of (D) | | | % | 20 | 55 | 45 | 45 |
| Charpy Impact Strength | | | kJ/m$^2$ | 16 | 22 | 15 | 20 |
| Flexural Strength | | | MPa | 135 | 251 | 172 | 259 |
| Flexural Modulus | | | MPa | 5700 | 15700 | 13600 | 14300 |
| Heat Resistance | | | °C. | 79 | 100 | 99 | 98 |
| Moldability | | | — | A | C | A | C |
| Flame Retardancy | | | — | C | C | B | C |
| Weld Strength | | | N | 154 | 213 | 137 | 210 |

TABLE 5

| Comparative Example No. | | | | 5 | 6 | 7 | 8 | 9 |
|---|---|---|---|---|---|---|---|---|
| C | A | | % | 95 | 95 | 95 | 95 | 95 |
| | G | G1-1 | % | | | | | |
| | | G1-2 | % | 5 | 5 | 5 | 5 | 5 |
| | | G1-3 | % | | | | | |
| B-1 | | | Parts | 10 | 10 | | | |
| B-2 | | | Parts | | | 10 | | |
| B-3 | | | Parts | | | | 10 | |
| B-4 | | | Parts | | | | | 10 |
| D-1 | | | Parts | | | | | |
| D-2 | | | Parts | 121.7 | 116 | 116.0 | 116.0 | 116.0 |
| D-3 | | | Parts | | | | | |
| D-4 | | | Parts | | | | | |
| D-5 | | | Parts | | | | | |
| E-1 | | | Parts | | | | | |
| E-2 | | | Parts | 8 | | | | 8 |
| E-3 | | | Parts | | | | | |
| E-4 | | | Parts | | | | | |
| E-5 | | | Parts | | 8 | 8 | 8 | |
| E-6 | | | Parts | | | | | |
| F-1 | | | Parts | | | | | |
| F-2 | | | Parts | 30 | 23 | 23 | 23 | 23 |

TABLE 5-continued

| Comparative Example No. | | 5 | 6 | 7 | 8 | 9 |
|---|---|---|---|---|---|---|
| F-3 | Parts | | | | | |
| F-4 | Parts | | | | | |
| H | Parts | | | 0.8 | | |
| Proportion of (D) | % | 45 | 45 | 45 | 45 | 45 |
| Charpy Impact Strength | kJ/m$^2$ | 16 | 13 | 24 | 23 | 18 |
| Flexural Strength | MPa | 242 | 227 | 230 | 231 | 248 |
| Flexural Modulus | MPa | 14000 | 13500 | 14000 | 14000 | 14200 |
| Heat Resistance | °C. | 84 | 97 | 99 | 98 | 98 |
| Moldability | — | A | A | A | A | C |
| Flame Retardancy | — | B | B | B | B | B |
| Weld Strength | N | 189 | 190 | 158 | 156 | 150 |

The amounts of the PET resin (B), the inorganic filler (D), the glycidyl ether unit-containing polymer (E), the phosphate ester-based flame retardant (F), and the flame retardant aid (H) in Tables 1 to 5 are the amount(parts) relative to 100 parts of the resin main component (C). In addition, "proportion of D" is the proportion (%) of the inorganic filler (D) to 100% of the reinforced thermoplastic resin composition.

As illustrated in Tables 1 to 5, the reinforced thermoplastic resin composition obtained in each Example was excellent in the moldability. In addition, from the reinforced thermoplastic resin composition obtained in each Example, the molded article excellent in the impact resistance, the rigidity, the mechanical strength, and the heat resistance, the flame retardancy, and the weld strength was obtained.

On the other hand, in the cases of Comparative Examples 1 to 9, any item of the moldability of the reinforced thermoplastic resin composition, the impact resistance, the rigidity, the mechanical strength, and the heat resistance, the flame retardancy, and the weld strength of the molded article was inferior.

Specifically, in the case of Comparative Example 1 in which the proportion of the polycarbonate resin (A) was low and the proportion of the graft copolymer (G) was high, the flame retardancy of the molded article was inferior.

In the case of Comparative Example 2 in which the proportion of the inorganic filler (D) is high, the moldability was inferior.

In the case of Comparative Example 3 not containing the glycidyl ether unit-containing polymer (E), the impact resistance was inferior.

In Comparative Examples 7, 8 and 9 not containing the PET resin obtained by solid phase polymerization of recycled material as the PET resin (B), the weld strength and moldability of the molded article were inferior.

In the case of Comparative Example 4 in which the content of the glycidyl ether unit-containing polymer (E) is 12 parts with respect to 100 parts of the resin main component (C) and a mass average molecular weight of the glycidyl ether unit-containing polymer (E) was 70, 200, the moldability and the flame retardancy of the molded article were inferior.

In the case of Comparative Example 5 in which the content of the phosphate ester-based flame retardant (F) was 30 parts with respect to 100 parts of the resin main component (C), the heat resistance of the molded article was inferior.

In the case of Comparative Example 6 in which the mass average molecular weight of the glycidyl ether unit-containing polymer (E) was 1,650, the impact resistance of the molded article was inferior.

In addition, from the comparison between Example 11 and Comparative Example 3, it is understood that the reinforced thermoplastic resin composition of the present invention is superior to a reinforced thermoplastic resin composition not containing the glycidyl ether unit-containing polymer (E) in the impact resistance when formed into the molded article.

From the comparison between Example 11 and Comparative Examples 7, 8, 9, it is understood that the reinforced thermoplastic resin composition of the present invention is superior to a reinforced thermoplastic resin composition not containing PET resin (B) obtained by solid-phase polymerization of recycled material in the weld strength when formed into the molded article.

In the case of Comparative Example 10 in which the content of the glycidyl ether unit-containing polymer (E) was 12 parts with respect to 100 parts of the resin main component (C), the flame retardancy of the molded article was inferior.

INDUSTRIAL APPLICABILITY

The reinforced thermoplastic resin composition of the present invention is particularly useful as a material of the housing of the mobile devices (a notebook type or tablet type personal computer, a mobile phone including a smart phone, a digital camera, a digital video camera, and the like).

The invention claimed is:

1. A reinforced thermoplastic resin composition comprising:
    a resin main component (C) including 80% to 100% by mass of a polycarbonate resin (A), and 0% to 20% by mass of a graft copolymer (G) obtained by polymerizing a monomer mixture (m1) containing an aromatic alkenyl compound and a vinyl cyanide compound in a presence of a rubbery polymer (G1) (herein, the total of the polycarbonate resin (A) and the graft copolymer (G) is 100% by mass of the total mass of the resin main component (C));
    a polyethylene terephthalate resin (B);
    an inorganic filler (D); and
    a glycidyl ether unit-containing polymer (E), and satisfying following requirements (a) to (c):
    (a) the polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C), (b) a content of the inorganic filler (D) is 20% to 50% by mass in 100% by mass of the reinforced thermoplastic resin composition, and
(c) the glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C).

2. The reinforced thermoplastic resin composition according to claim 1,
wherein the resin main component (C) includes 80% to 95% by mass of the polycarbonate resin (A) and 5% to 20% by mass of the graft copolymer (G).

3. The reinforced thermoplastic resin composition according to claim 2,
wherein the inorganic filler (D) is a carbon fiber.

4. The reinforced thermoplastic resin composition according to claim 3,
wherein the inorganic filler (D) is a glass fiber.

5. A molded article obtained by using the reinforced thermoplastic resin composition according to claim 4.

6. A molded article obtained by using the reinforced thermoplastic resin composition according to claim 2.

7. The reinforced thermoplastic resin composition according to claim 1,
wherein the inorganic filler (D) is a carbon fiber.

8. A molded article obtained by using the reinforced thermoplastic resin composition according to claim 7.

9. The reinforced thermoplastic resin composition according to claim 1,
wherein the inorganic filler (D) is a glass fiber.

10. A molded article obtained by using the reinforced thermoplastic resin composition according to claim 9.

11. A molded article obtained by using the reinforced thermoplastic resin composition according to claim 1.

12. A reinforced thermoplastic resin composition comprising:
a resin main component (C) including 80% to 100% by mass of a polycarbonate resin (A), and 0% to 20% by mass of a graft copolymer (G) obtained by polymerizing a monomer mixture (m1) containing an aromatic alkenyl compound and a vinyl cyanide compound in a presence of a rubbery polymer (G1) (herein, the total of the polycarbonate resin (A) and the graft copolymer (G) is 100% by mass of the total mass of the resin main component (C));
a polyethylene terephthalate resin (B);
an inorganic filler (D);
a glycidyl ether unit-containing polymer (E); and
a phosphate ester-based flame retardant (F), and satisfying following requirements (a) to (d):
(a) the polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C),
(b) a content of the inorganic filler (D) is 20% to 50% by mass in 100% by mass of the reinforced thermoplastic resin composition,
(c) the glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C), and
(d) a content of the phosphate ester-based flame retardant (F) is 1 to 25 parts by mass with respect to 100 parts by mass of the resin main component (C).

13. The reinforced thermoplastic resin composition according to claim 2,
wherein the resin main component (C) includes 80% to 95% by mass of the polycarbonate resin (A) and 5% to 20% by mass of the graft copolymer (G).

14. The reinforced thermoplastic resin composition according to claim 13,
wherein the inorganic filler (D) is a carbon fiber.

15. The reinforced thermoplastic resin composition according to claim 13,
wherein the inorganic filler (D) is a glass fiber.

16. A molded article obtained by using the reinforced thermoplastic resin composition according to claim 15.

17. The reinforced thermoplastic resin composition according to claim 12,
wherein the inorganic filler (D) is a carbon fiber.

18. The reinforced thermoplastic resin composition according to claim 12,
wherein the inorganic filler (D) is a glass fiber.

19. A molded article obtained by using the reinforced thermoplastic resin composition according to claim 12.

20. A method of manufacturing a reinforced thermoplastic resin composition, the method comprising:
a step of obtaining a graft copolymer (G) by polymerizing a monomer mixture (m1) containing an aromatic alkenyl compound and a vinyl cyanide compound in a presence of a rubbery polymer (G1);
a step of preparing a resin main component (C) with 80% to 100% by mass of the total mass of the resin main component (C) of a polycarbonate resin (A) and 0% to 20% by mass of the total mass of the resin main component (C) of the graft polymer (G) (herein, the total of the polycarbonate resin (A) and the graft copolymer (G) is 100% by mass of the total mass of the resin main component (C)); and
a step of mixing the above (C), a polyethylene terephthalate resin (B), an inorganic filler (D), and a glycidyl ether unit-containing polymer (E), and satisfying following requirements (a) to (c):
(a) the polyethylene terephthalate resin (B) is a solid phase polymerized material of recycled and/or repelletized polyethylene terephthalate resin, and a content of the polyethylene terephthalate resin (B) is 5 to 20 parts by mass with respect to 100 parts by mass of the resin main component (C),
(b) a content of the inorganic filler (D) is 20% to 50% by mass in 100% by mass of the reinforced thermoplastic resin composition, and
(c) the glycidyl ether unit-containing polymer (E) has a mass average molecular weight of 3,800 to 60,000, and a content of the glycidyl ether unit-containing polymer (E) is 1 to 10 parts by mass with respect to 100 parts by mass of the resin main component (C).

* * * * *